United States Patent Office 3,075,607
Patented Jan. 29, 1963

---

3,075,607
SEISMIC EXPLORATION
Alexander R. Aitken, John A. F. Gerrard, and George P. Sarrafian, Dallas, and Hal J. Jones, Houston, Tex., assignors to Texas Instruments Incorporated, Dallas, Tex., a corporation of Delaware
Filed Dec. 31, 1958, Ser. No. 784,292
4 Claims. (Cl. 181—.5)

Prior to the present invention, the process of seismic exploration has been carried out by making seismic records in the field. These seismic records are then physically transported back to a data processing location where the records are analyzed mentally, or with the aid of analytical apparatus such as that disclosed in the Patent No. 2,794,965, issued June 4, 1957, to William J. Yost. This procedure necessarily takes a lot of time. The final results of any test are often not available until days after the test is performed.

According to the system of the present invention, the seismic signals produced by the geophones are sequentially sampled and the sequentially sampled amplitudes are converted into digital data. The digital data is then transmitted over a radio link to a computer, such as disclosed in British Patent 749,836, issued June 6, 1956, at the data processing center which processes the seismic data and makes the results available after a matter of minutes instead of days.

Prior to the present invention there was no known method which gave satisfactory results of operating a digital computer to process seismic data. This lack was due to the fact that the mental process of analyzing the analog seismic records was for a large part subjective and hence could not be programmed into a digital computer.

The present invention comprises a method of programming a digital computer to process the seismic data to give results superior to those obtained by the subjective mental or analog methods of the prior art.

An additional object is to provide an improved method of seismic exploration which lends itself to an improved quality, or as it is sometimes identified, a more sophisticated data reduction procedure.

Figure 1:
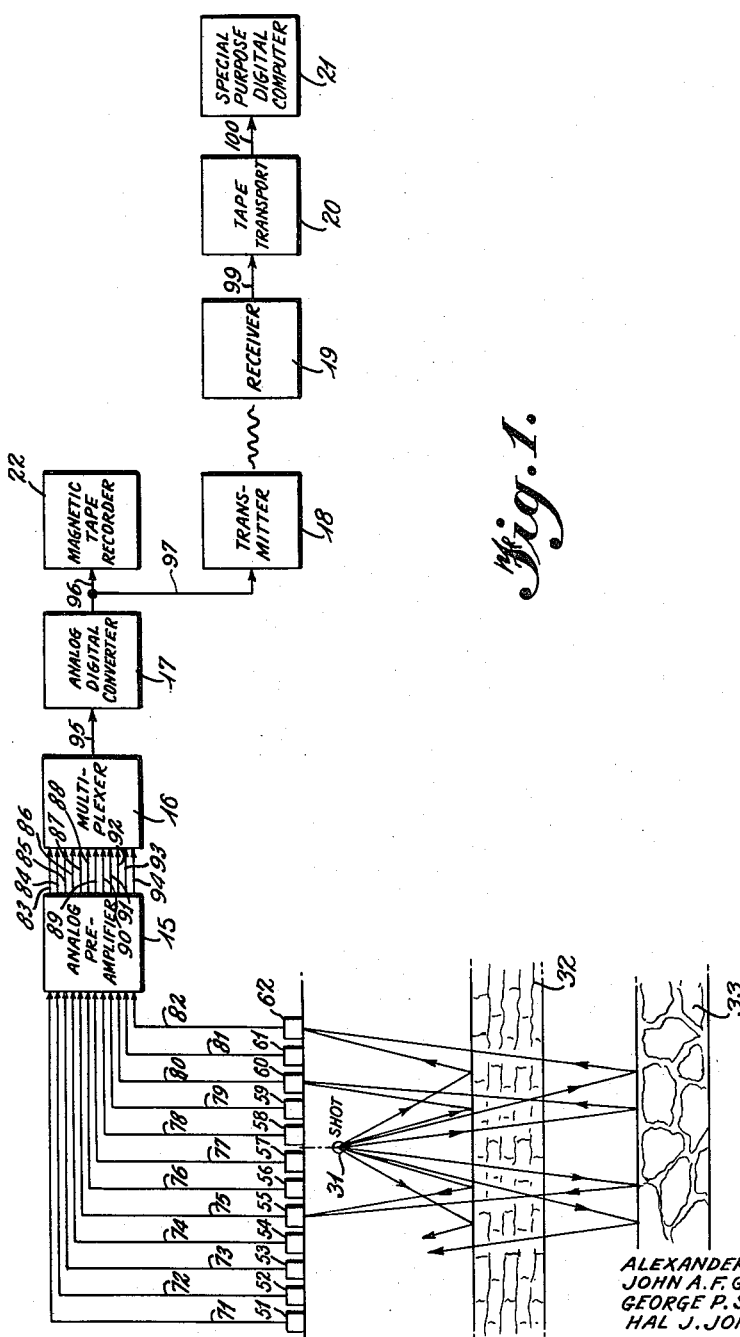
Figure 2:
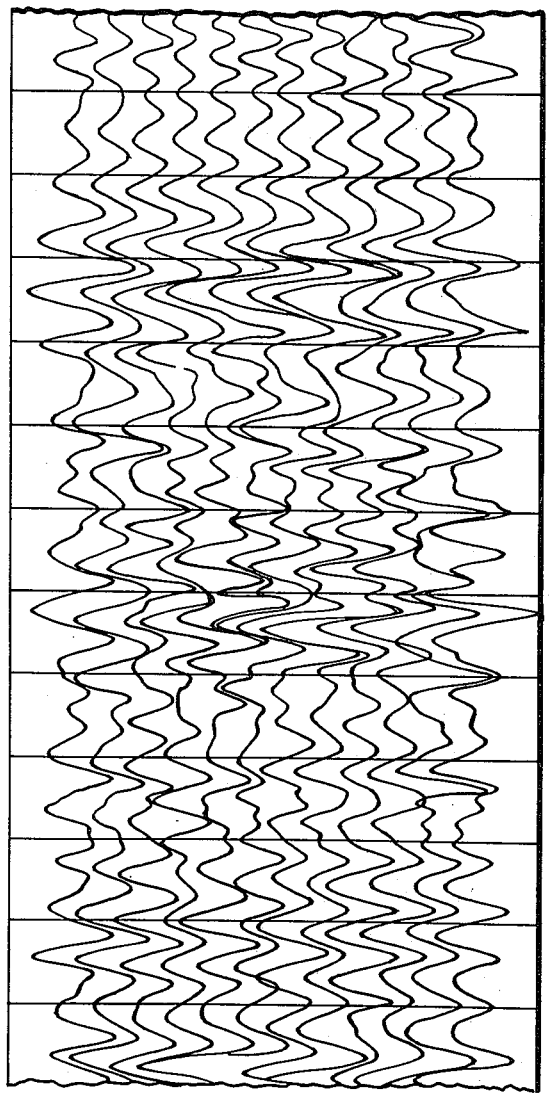

Further objects and advantages of the present invention can be understood when taken in conjunction with the following drawings in which:

FIG. 1 is a block diagram illustrating the over-all method and system of seismic surveying; and FIG. 2 is an analog representation of a typical set of seismic signals that may be obtained in a method of seismic surveying or that may be obtained when monitoring the system of the present invention.

In a seismic surveying operation an explosion is set off below the ground to send shock waves traveling through the earth. This explosion is referred to in the art as a shot. In FIG. 1 the point of the explosion is designated by the reference number 31. The shock waves travel in the direction indicated by the arrows and are reflected by the rock strata 32 and 33. After being reflected by the rock strata, the shock waves travel up to geophones 51 through 62 which are spaced laterally across the earth's surface. The geophones 51 through 62 transduce the waves into eletcrical energy to produce 12 analogue electrical signals in 12 separate channels which we shall refer to as channels 1 throuhg 12, respectively. These signals are referred to as seismic signals. The reflected shock waves in the seismic signals are referred to as reflection zones. A typical series of seismic signals that would be obtained by monitoring such a process is shown in FIG. 2. From these signals the depth and dip of the strata 32 and 33 can be determined.

The 12 seismic signals produced by the geophones 51 through 62 are applied through connecting leads 71–82 to different channels of a multichannel preamplifier 15. After being amplified by the preamplifier 15 the analogue seismic signals are applied through connecting leads 83–94 to a multiplexer 16, which samples the amplitude of each seismic signal at regular time intervals and then transmits the samples through connecting lead 95 in a single channel sequentially to analogue-to-digital converter 17.

According to Shannon's sampling theorem, an analogue signal containing no frequencies $f$ cycles per second or higher may be completely represented by a set of samples $$\frac{1}{2f}$$

seconds apart in time. For example, an analogue signal containing no frequencies 250 cycles per second or higher can be completely represented by samples taken two milliseconds apart. It should be pointed out, however, that frequencies 250 cycles per second or above may not be filtered out from an analogue signal by sampling the analogue signal at two millisecond intervals. Nevertheless, a faithful representation of an ordinary seismic signal may be made for the purposes of digital analysis by samples taken not impractically close to one another. For most seismic signals, the sampling at intervals of two milliseconds will be satisfactory.

The multiplexer, since it samples the amplitudes of all twelve channels, will transmit 12 sampled amplitudes for each sampling interval to the analogue to digital converter 17. The analogue to digital converter 17 converts each sampled amplitude to a binary number. The analogue to digital converter also identifies each group of sampled amplitudes for each sampling interval and assigns a binary number to each group to identify the time of the sampling for that group. The binary number assigned to each group of sampled amplitudes equals the time interval between the time of the shot and the time of sampling of such group of sampled amplitudes. These time intervals are expressed in sampling intervals rather than seconds to facilitate the operation of the assigning of these time intervals to each group. A simple counter may be used to determine the time interval assigned to each group of sampled intervals. If the count registered in the counter is increased by one for each succeeding group, the count registered in the counter will always be the time interval, expressed in sampling intervals, between the time of the sampling and the time of the shot.

The binary data including the sampled amplitudes and the assigned time intervals may be delivered through connecting lead 96 to and recorded by magnetic tape recorder 22 to provide a record of the data in the field. The data is also delivered through lead 97 to transmitter 18 and then transmitted by transmitter 18 over a radio link to receiver 19 in the data processing center. The data received by receiver 19 is delivered through connection 99 to tape transport 20 and recorded in binary digital form on a magnetic tape loop on tape transport 20. The data is then fed from the magnetic tape loop to computer 21 through connection 100 where it is processed. In the computer the data is digitally filtered, corrected for time displacement, the reflection zones determined which is called reflection picking, and then the depth and dip information computed.

If $O(t)$ is a time function with a value of Zero outside some finite time interval and if $X(t)$ is another time function, then the function $$\Phi(\tau) = K \int_{-\infty}^{+\infty} O(t) \times (t+\tau) dt$$

constitutes a time function with certain frequencies reduced and/or eliminated from $X(t)$. In other words, $\Phi(\tau)$ is what is obtained after $X(t)$ has been filtered. The frequency transfer function $Y(\omega)$ of such filtering is the frequency spectrum $G(\omega)$ of the function $O(t)$. Thus, by a proper choice of the filter operator $O(t)$ any filter may be simulated including many which are not realizable by conventional L-C circuits. This kind of filtering is called cross-correlation (or convolution where the sign is minus) filtering. In the case of a signal existing in gaussian noise, the optimum cross-correlation filter procedure involves the cross-correlation between a representation of the signal and the signal plus noise function. Although the noise in a seismic signal is not actually gaussian, quite favorable results can be obtained by using a typical shock wave reflection in the seismic signal as the filter operator $O(t)$.

To carry out this operation digitally, the operator $O(t)$ is sampled at 32 points at sampling intervals equal to the sampling interval used in obtaining the digitalized seismic signals. The amplitude of the operator at each of these 32 points is converted to the binary system to give 32 binary numbers $O_1$ through $O_{32}$. Letting the binary numbers equalling the sampled amplitudes of the seismic signal for a single channel be designated by $X_1, X_2, X_3, \ldots X_n \ldots$ in which the subscript indicates the time of the sampling, the computer is programmed to solve for each sampled amplitude of the seismis signal the equation $$\Phi_t = \sum_{K=0}^{31} O_{K+1} X_{t+K}$$

in which $X(t)$ is any one of the sampled amplitudes of the seismic signal. The $\Phi$'s obtained then will represent the amplitudes of the seismic signal after it has been filtered.

For every $\Phi$, an $X$ is determined. Thus, $\Phi_t$ is determined for $X(t)$. Together all of the $\Phi$'s for one seismic signal comprise sampled amplitudes of the filtered seismic signal. These $\Phi$'s are spaced at the same intervals or the sampling intervals of the $X$'s.

The computer is programmed to carry out this filtering operation on the seismic signals of each of the 12 channels. This operation will produce twelve series of binary numbers, one series for each channel, each of which is the sequentially sampled amplitudes of a seismic signal of a different one of the signal channels after such seismic signal has been filtered. These filtered seismic signals of channels 1 through 12 shall be designated $\Phi_1(t)$ through $\Phi_{12}(t)$, respectively. The series of binary numbers which make up the sequentially sampled amplitudes of the functions $\Phi(t)$ shall be designed as follows:

$$\Phi'(t) = \Phi_1', \Phi_2', \Phi_3', \ldots \Phi_n', \ldots$$
$$\Phi^2(t) = \Phi_1^2, \Phi_2^2, \Phi_3^2, \ldots \Phi_n^2, \ldots$$
$$\Phi^{12}(t) = \Phi_1^{12}, \Phi_2^{12}, \Phi_3^{12}, \ldots \Phi_n^{12}, \ldots$$

In each binary number of the above series of binary numbers, the superscript designates the channel of the filtered function of which such binary number is a sampled amplitude, and the subscript is the time interval between the shot and the sampling of the filtered function to produce such binary number. The unit of the time intervals expressed by the subscripts is sampling intervals.

In carrying out the filtering operation for one of the seismic signals it is convenient to perform the summation for several $\Phi$'s at once. To do this, partially completed summations for $\Phi_{t-1}$ through $\Phi_{t-31}$ will be stored in the computer at sequential adresses in the computer. Then $X(t)$ is multiplied in sequence by the values $O_1$ through $O_{32}$. The product $X_t O_1$ will be stored to start a new summation. The product $X_t O_2$ will be added to the partially computed sum for $\Phi_{t-1}$. Likewise, each of the products $X_t O_3$ through $X_t O_{32}$ will be added to the partially completed summations $\Phi_{t-2}$ through $\Phi_{t-31}$, respectively, to further compute these summations. The summation $\Phi_{t-31}$ would then be completed and the summations $\Phi_t$ through $\Phi_{t-30}$ would be partially completed. Next, the seismic signal amplitude $X_{t+1}$ would be multiplied times $O_1$ through $O_{32}$. The resulting product $O_1 X_{t+1}$ would start a new summation $\Phi_{t+1}$ and resulting products $O_2 X_{t+1}$ through $O_{32} X_{t+1}$ would be added to the partially computed sums $\Phi_t$ through $\Phi_{t-30}$. This process will go on until all of the $\Phi$'s have been computed for the seismic signal.

As is well known in the seismic surveying art, the times of the seismic signals must be corrected for normal moveout, and incremental shock wave velocity increases with depth. Also, a static time correction must be added to each signal. Because of the incremental average velocity increase with depth, the time correction is less for that part of the seismic signal which occurs later. Thus, if $t$ designates the time interval from the shot to the amplitude sampling, the time correction will vary with $t$ and must be determined for each $t$. The time correction for each $t$ is often determined from the formula $\Delta T = \Delta T_s + A$ in which $\Delta T_s$ is the known static time correction and $$A = \frac{d^2}{2t(V_0 + V_1 t)^2}$$

In the formula for A, $d$ equals the lateral distance between the geophone producing the seismic signal and the shot, $V_0$ is the average initial velocity, and $V_1$ is the incremental increase in the average velocity with depth.

By rearranging the terms of the formula for A, the equation $$2V_1^2 t^3 + 2V_0 V_1 t^2 + 2V_0^2 t - \frac{d^2}{A} = 0$$

is obtained. If an arbitrary value is assumed for A, for example 50 sample intervals, then the expression on the left side of the equation will have a negative value for all $t$ less than the $t$ for which the assumed value of A is correct. Therefore, if the expression $$2V_1^2 t^3 + 2V_0 V_1 t^2 + 2V_0^2 t - \frac{d^2}{A}$$

is evaluated for increasing values of $t$ with A equal to the assumed value, the value of $t$ at the time the expression turns positive will be the $t$ for which the assumed value of A is correct.

By evaluating the expression for increasing $t$ and decreasing the value of A by one increment each time the expression becomes positive, the A's for each $t$ after the $t$ for which the arbitrarily assumed value of A is correct may be determined. The computer is programmed to carry out these operations and thus the $\Delta T$'s are determined. In this programming the value of A is initially chosen large enough that the $\Delta T$ at which the value of the expression goes positive occurs in the seismic signals prior to the useful part of the seismic signals.

It is convenient to program the computer to determine the time correction $\Delta T$ for each $\Phi$ along with the determination of such $\Phi$.

To carry out the operation of reflection picking, each one of the filtered seismic signals is operated on to form a function $p(t)$ and $a(t)$ from each seismic signal. The function $p(t)$ is formed from a seismic signal by identifying the peaks and troughs of the seismic signal. The function $p(t)$ is made to equal 1 at the time of each of the peaks and made to equal zero at each of the troughs. Numerical representation of straight lines are then connected between the peaks and the troughs thus forming the new function $p(t)$. The function $a(t)$ is derived from a seismic signal by identifying the peaks and troughs of the seismic signal. The function $a(t)$ is then made to equal the absolute value of the peaks and troughs at the times of the respective peaks and troughs. Straight lines are then connected between the adjacent absolute values and thus the function $a(t)$ is derived from the seismic signal. The functions $a^1(t)$ through $a^{12}(t)$ are derived from the filtered seismic signals of channels 1 through 12, respectively. The functions $p^1(t)$ through $p^{12}(t)$ are derived from the filtered seismic signals of channels 1 through 12, respectively.

From the functions $a^1(t)$ through $a^{12}(t)$, a plurality of search functions $A(\theta, t)$ are computed at each sampling from the following formula:

$$A(\theta, t) = \frac{1}{12}\sum_{N=1}^{12} a^N\left(t + \frac{N-1}{11}\theta\right)$$

This formula for $A(\theta, t)$ perhaps may be better understood graphically. If the functions $a^1(t)$ through $a^{12}(t)$ were plotted on the same time coordinates with each function placed in order according to its superscript, then the values of the function $a^1(t)$ through $a^{12}(t)$ used in the summation in the formula for computing $A(\theta, t)$ will be found at the intersection of a straight line with the zero amplitude ordinate of each of the functions $a^1(t)$ through $a^{12}(t)$. The straight line is referred to as a search line. The search line will intersect the zero amplitude ordinate of $a^1(t)$ at time $t$ and the zero ordinate of the function $a^{12}(t)$ at the time $t+\theta$. The search factors $A(\theta, t)$ computed at each sampling interval will have different $\theta$'s ranging from plus 4 to minus 4 sampling intervals.

From the functions $p^1(t)$ through $p^{12}(t)$ a plurality of search functions $P(\theta, t)$ are computed from the following formula:

$$P(\theta, t) = \sum_{M=-S}^{S}\left[Pr\frac{1}{12}\sum_{N=1}^{12}P^N\left(t + \frac{N-1}{11}\theta + M\right) - \frac{1}{12}\sum_{L=1}^{12}P^L\left(t + \frac{L-1}{11}\theta + M\right)\right]$$

In this formula $Pr$ is a constant equal to 0.25 which is the average coherence coefficient for a set of random time functions, and $S$ is an integer selected so that $2S$ is the approximate length of a single cycle of one of the central frequencies in the spectrum of a shock wave reflection.

The formula for $P(\theta, t)$ may be better understod if explained graphically. If the functions $p^1(t)$ through $p^{12}(t)$ are plotted on the same time coordinates with their zero amplitude ordinates equally spaced and each function placed in sequence according to its superscript, then the summation $$\frac{1}{12}\sum_{L=1}^{12}P^L\left(t + \frac{L-1}{11}\theta\right)$$

equals the average value of the values of the functions $a^1(t)$ through $a^{12}(t)$ at the intersection of the zero ordinates of the functions with a search line intersecting $a^1(t)$ at time $t$ and intersecting $a^{12}(t)$ at time $t+\theta$. The summation $$\frac{1}{12}\sum_{N=1}^{12}P^N\left(t + \frac{N-1}{11}\theta\right) - \frac{1}{12}\sum_{L=1}^{12}P^L\left(t + \frac{L-1}{11}\theta\right)$$

then equals the average of the absolute values of a series of numbers obtained by taking the value of each function at the intersection with the said search line and subtracting from each value the average value of the functions at all the intersections. The average of the absolute values of the series of numbers is obtained as described above for each of a series of parallel search lines spaced at intervals of one sampling interval. If each of these averages is subtracted from $Pr$ and the results of the subtraction added together, then the summation $$\sum_{M=-S}^{S}\left[Pr - \frac{1}{12}\sum_{N=1}^{12}P^N\left(t + \frac{N-1}{11}\theta + M\right) - \frac{1}{12}\sum_{L=1}^{12}P^L\left(t + \frac{L-1}{11}\theta + M\right)\right]$$

will be obtained.

For each $\theta$ and $t$ a combined search factor $S(\theta, t)$ is obtained from the formula $S(\theta, t) = K_0 P(\theta, t)[A(\theta, t) + K_s]$ in which $K_0$ and $K_s$ are constants. After all of the combined search functions $S(\theta, t)$ are obtained they are examined to determine whether they exceed an arbitrary selection level $L_1$. If one of the $S(\theta, t)$'s for any given time $t$ is found to be above the arbitrary selection value, the highest $S(\theta, t)$ for that time $t$ is selected as indicating the existence of a reflection zone.

Once the existence of a reflection zone is determined, the criteria selection level is changed from $L_1$ to $L_2$, which is slightly less than $L_1$ for all the $S(\theta, t)$'s of that reflection zone. Thus, the reflection zones are identified. The depth and dip of the rock stratum or strata causing each reflection zone can then be determined.

The computer is programmed to carry out this reflection picking operation. Of course, the computer operates on the $\Phi$'s, the binary numbers which represent the sequentially sampled seismic signals after they have been filtered and time corrected.

To identify the peaks and troughs, the series of $\Phi$'s representing each seismic signal are taken in time sequence and each preceding $\Phi$ is subtracted from each succeeding $\Phi$. Whenever the sign of the result of this series of subtractions changes from positive to negative, a peak is identified at this point. Whenever the results from the series of subtractions change from negative to positive a trough is identified at this time.

To compute the function $p(t)$ from a seismic signal the computer is programmed to assign the binary number 1 to the time of the identified peaks and 0 to the time of the identified troughs. At the standard sampling intervals between the peaks and the troughs, the computer is programmed to assign values interpolated between 0 and 1. Thus, a series of binary numbers are computed assigned to times at the standard sampling intervals. This series of numbers will represent sequentially sampled amplitudes of a $p(t)$. The computer is programmed to make this computation for each filtered seismic signal to produce a series of binary numbers for each seismic signal. These series of binary numbers shall be identified as follows.

$$p^1(t) = p_1^1, p_2^1, p_3^1 \ldots p_n^1 \ldots$$
$$p^2(t) = p_1^2, p_2^2, p_3^2 \ldots p_n^2 \ldots$$
$$p^3(t) = p_1^3, p_2^3, p_3^3 \ldots p_n^3 \ldots$$
$$* \quad * \quad * \quad * \quad *$$
$$p^{12}(t) = p_1^{12}, p_2^{12}, p_3^{12} \ldots p_n^{12}$$

Here again, the superscripts designate the channel and the subscripts designate the time $t$.

To compute the function $a(t)$ for a seismic trace the computer is programmed to assign the absolute value of the amplitudes of the filtered and time corrected seismic signal to the times of the peaks and troughs. The computer is programmed to assign at the standard sampling intervals between the times of the peaks and troughs, values interpolated between the values assigned at the peaks and troughs. Thus, a series of binary numbers are computed and assigned to times at the standard sampling interval. This series of numbers will represent the sequentially sampled function $a(t)$ derived from the filtered signal.

The computer is programmed to make this computation for each filtered seismic signal to produce a series of binary numbers for each seismic signal. These series of numbers shall be identified as follows.

$$a^1(t) = a_1^1, a_2^1, a_3^1 \ldots a_n^1 \ldots$$
$$a^2(t) = a_1^2, a_2^2, a_3^2 \ldots a_n^2 \ldots$$
$$a_3(t) = a_1^3, a_2^3, a_3^3 \ldots a_n^3 \ldots$$
$$* \quad * \quad * \quad * \quad *$$
$$a^{12}(t) = a_1^{12}, a_2^{12}, a_3^{12} \ldots a_n^{12} \ldots$$

The subscript of the $a$'s of each of these series designates the time $t$ and the superscript designates the channel. The computer is programmed to compute $A(\theta, t)$ for each $t$ and $\theta$ according to the formula:

$$A(\theta, t) = \frac{1}{12}\sum_{N=1}^{12} a_t{}^N + D_N$$

in which $D_N$ equals a set of digital delays such that $D_{12} = \theta$, $D_1 = 0$ and the other $D_N$'s are chosen such that $$D_N - \frac{n-1}{11}\theta$$

is equal to a minimum. The computer is programmed to compute $P(\theta, t)$ according to the formula $$P(\theta, t) = \sum_{M=-S}^{S}\left[ Pr - \frac{1}{12}\sum_{N=1}^{12} P^N t + D_N + M \right.$$
$$\left. - \frac{1}{12}\sum_{L=1}^{12} P_t{}^L + D + M \right.$$

in which $D_N$ is determined in the same manner it is determined in the formula for determining $A(\theta, t)$.

The computer is programmed to then compute $S(\theta, t)$ for each $\theta$ and $t$ according to formula $$S(\theta, t) = K_0 P(\theta, t)[A(\theta, t) + K_s]$$

The computer is programmed to select the reflection zones in the following manner. All of the $S(\theta, t)$'s are compared in time sequence with $L_1$ to determine which $S(\theta, t)$'s are greater than $L_1$. When one of the $S(\theta, t)$'s is found to be greater than $L_1$, the $S(\theta, t)$ at the same time $t$ having the highest value is selected and recorded along with the $\theta$ and $t$ used to compute the selected $S(\theta, t)$. The selected $S(\theta, t)$ indicates the existence of a reflection zone. Once the existence of a reflection zone has been indicated, all the succeeding $S(\theta, t)$'s in the same reflection zone are compared with $L_2$, which is slightly less than $L_1$, to minimize fluctuations at the beginning and end of the reflection zone.

The computer is programmed to determine accurately the times and responses from the reflection zones using the data obtained from the operation of selecting reflection zones. The computer carries out this operation by examining the reflection zone information with increasing $t$ until a picked zone is encountered. The computer then examines the values of $\Phi^1(t)$ occurring after the time of the start of the picked reflection zone to locate the first trough occurring in $\Phi^1(t)$ after the start of the picked reflection zone. The computer next examines the value of $\Phi^{12}(t)$ to find the nearest trough in the function $\Phi^{12}(t)$ to a time occurring the time $\theta$ after the time of the trough determined in $\Phi^1(t)$. The times of the two located troughs then are recorded. The computer is programmed to carry out the above operation for each picked reflection.

The computer may be programmed to make these recorded times of these troughs available to the operator, or the computer may be programmed to convert this information into dips and depths for the strata causing the reflections.

In the above description the number of seismic signal channels is twelve. The invention, of course, may be used with a different number of channels. This and other modifications are deemed to come within the spirit and scope of the invention which is to be limited only as defined in the appended claims.

What is claimed is:
1. A method of seismic exploration comprising the steps of:
   a. creating a seismic disturbance at a field test site where reflection zones of interest may be present,
   b. detecting the seismic waves resulting from said seismic disturbance and converting the detected waves into a series of electrical signals from spaced points in the vicinity of said seismic disturbance,
   c. amplifying said series of electrical signals in an analog preamplifier and
   d. delivering said series to multiplexing means and
   e. therein mixing and combining said series into a single channel of analog signal,
   f. delivering said single channel of analog signal to an analog-to-digital converter and
   g. converting said single channel of analog signal into a single channel of digital signal,
   h. delivering said single channel of digital signal to a radio transmitter,
   i. transmitting said digital signal to a remotely located radio receiver,
   j. delivering said received digital signal to a computer, and
   k. unscrambling said previously mixed signal, and
   l. analyzing said received signal for detecting reflection zones whereby an immediate result is obtained at said remote location while said seismic exploration operation is in progress.

2. A method of seismic exploration as in claim 1, wherein said step of unscrambling said mixed signal comprises digitally filtering and separating said signal into a plurality of digital signals for computation purposes.

3. A method of seismic exploration as in claim 2, wherein said step of analyzing said received signal comprises: generating a set of first functions based on the absolute values of the peaks of said plurality of digital signals; generating a set of second functions based on the positive and negative peaks of said digital signals; generating a set of third functions based on said first functions; generating a set of fourth functions based on said second functions; generating a set of fifth functions based on the combined third and fourth functions to provide a set of search functions for indicating the existence of a reflection zone.

4. A method of seismic exploration as in claim 3, wherein said search functions are generated in accordance with the formula:

$$S(\theta, t) = K_0 P(\theta, t)[A(\theta, t) + K_s]$$

References Cited in the file of this patent

UNITED STATES PATENTS

| | | |
|---|---|---|
| Re. 23,686 | Heising | July 14, 1953 |
| 2,265,513 | Burg | Dec. 9, 1941 |
| 2,794,965 | Yost | June 4, 1957 |
| 2,836,356 | Forrest et al. | May 27, 1958 |
| 2,845,597 | Perkins | July 29, 1958 |
| 2,874,356 | Peterson | Feb. 17, 1959 |